United States Patent [19]
Hale

[11] 3,897,932
[45] Aug. 5, 1975

[54] ACTUATOR DRIVE FOR FLUID CUT-OFF APPARATUS

[75] Inventor: Elden Arnold Hale, Pikesville, Md.

[73] Assignee: Koppers Company, Inc., Pittsburgh, Pa.

[22] Filed: Nov. 19, 1973

[21] Appl. No.: 417,238

Related U.S. Application Data

[63] Continuation-in-part of Ser. No. 245,880, April 20, 1972, Pat. No. 3,789,879.

[52] U.S. Cl. ............... 251/133; 251/134; 251/214; 251/174; 251/326; 251/266
[51] Int. Cl.² ................... F16K 31/04; F16K 3/314
[58] Field of Search .......... 251/214, 133, 174, 134, 251/135, 136, 266, 270, 271, 326

[56] References Cited
UNITED STATES PATENTS

| 550,711 | 12/1895 | Eads | 251/266 X |
| 916,831 | 3/1909 | Bettinger | 251/134 |
| 1,751,122 | 3/1930 | Barker | 251/266 |
| 1,829,182 | 10/1931 | Beaumont | 251/134 X |
| 2,018,383 | 10/1935 | Schofield | 251/266 X |
| 3,259,358 | 7/1966 | Tripoli | 251/214 |
| 3,363,536 | 1/1968 | Dean Jr. | 251/133 |

FOREIGN PATENTS OR APPLICATIONS

| 324,654 | 8/1920 | Germany | 251/174 |

*Primary Examiner*—Arnold Rosenthal
*Attorney, Agent, or Firm*—Oscar B. Brumback; Boyce C. Dent

[57] ABSTRACT

An actuator drive for fluid cut-off apparatus of the type having a pair of axially abutting conduits defining a space therebetween; an enclosure connecting the conduits and closing the space to surrounding atmosphere, the enclosure including an opening substantially perpendicular to the conduits; a closure in the opening movable into the space for preventing passage of fluid from one of the conduits to the other; and an actuator drive for moving the closure into and out of the enclosure, the actuator drive comprising a rotatable screw shaft mechanism extending substantially parallel to the path of travel of the closure and a linking mechanism connecting the screw shaft mechanism to the closure for moving the closure into and out of the space upon rotation of the screw shaft mechanism.

4 Claims, 6 Drawing Figures

ACTUATOR DRIVE FOR FLUID CUT-OFF APPARATUS

CROSS REFERENCES TO RELATED APPLICATIONS

This invention is a continuation-in-part of application Ser. No. 245,880 filed Apr. 20, 1972, now U.S. Pat. No. 3,789,879, by Elden A. Hale for a Self-Adjusting Sealing Apparatus assigned to the assignee of the present invention.

BACKGROUND OF THE INVENTION

1. Field of the Invention

The present invention relates generally to machine elements and mechanisms utilizing directly cooperating gears of the spiral screw and nut types and more specifically to an actuator mechanism for moving a closure into and out of a space in an enclosure in order to regulate the flow of a fluid through the enclosure.

2. Description of the Prior Art

The problems associated with sealing a space between a closure and a wall of an enclosure in order to prevent fluid from escaping through that space to the outside atmosphere when the closure moves into and out of the enclosure were discussed in the aforementioned co-pending application and these problems have been mostly overcome by use of the apparatus claimed in such application. However, the earlier invention utilized a conventional nonrotatable jackscrew and worm gear arrangement to propel the closure into and out of the enclosure. Although the jackscrew arrangement has many advantages, such as, for example, it is relatively inexpensive, it has a large mechanical advantage which reduces the power required to push or pull the closure, and by selecting the proper gear and screw ratios it can be made self-locking, it does have a distinct disadvantage.

It has been found that by using a conventional jackscrew, it was necessary to make it with a large diameter in order to push the closure into the enclosure. Thee working portion of the jackscrew, that is, that portion between the closure and the worm gear, is in compression when pushing the closure and is in tension when pulling the closure. It has been found that when the jackscrew is in compression it will not carry as heavy a load as when it is tension without buckling and the safe compression load decreases rapidly as the compressive length of the jackscrew increases. As an example, a five ton jackscrew with a ten foot length can pull 10,000 pounds, but if a jackscrew has a ten foot compressive length it will require approximately a 20 ton jackscrew of large diameter to push the same load at the same speed.

This invention provides an actuator that utilizes a screw shaft whose working length is always kept in tension during operation, even when the closure is being pushed into the enclosure, thus overcoming the disadvantage of the jackscrew.

SUMMARY OF THE INVENTION

Accordingly, an object of the present invention is to provide an actuator means that will overcome the aforementioned disadvantages and others; particularly for maintaining the working portion of a screw shaft always in tension. Thus, this invention provides an actuator means by which a smaller screw shaft can be utilized to both push and pull a closure into and out of an enclosure without being concerned whether the screw shaft will buckle when the closure is moving into the enclosure.

This is generally accomplished by providing a fluid cutoff apparatus with a pair of axially abutting conduits defining a space between the conduits; an enclosure connecting the conduits and closing the space to surrounding atmosphere, the enclosure including an opening substantially perpendicular to the conduits; a closure in the opening movable into the space for preventing passage of fluid from one of the conduits to the other; and an actuator means for moving the closure into and out of the enclosure, the actuator means including a rotatable screw shaft means extending substantially parallel to the path of travel of the closure and a linking means connecting the screw shaft means to the closure for moving the closure into and out of the space upon rotation of the screw shaft means.

More specifically, the rotatable screw shaft means includes a shaft having an external threaded portion which engages the linking means; a support means supporting one end of the shaft which allows the shaft to rotate therein but at the same time prevents the shaft from being pulled out of the support means; and a drive means connected to and supporting the other end of the shaft for rotating the shaft and, in addition, prevents the shaft from being pulled out of the drive means.

When the closure is being pulled out of the enclosure the shaft tries to move through the linking means toward the support means, but is prevented from doing so by the drive means, thus, the working portion of the shaft between the linking means and the drive means will be in tension. When the closure is being pushed into the enclosure the shaft tries to move through the linking means toward the drive means, but is prevented from doing so by the support means, thus, the working portion of the shaft between the linking means and the support means will be in tension.

The above and further objects and novel features of the invention will appear more fully from the following detailed description when the same is read in connection with the accompanying drawings. It is to be expressly understood, however that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
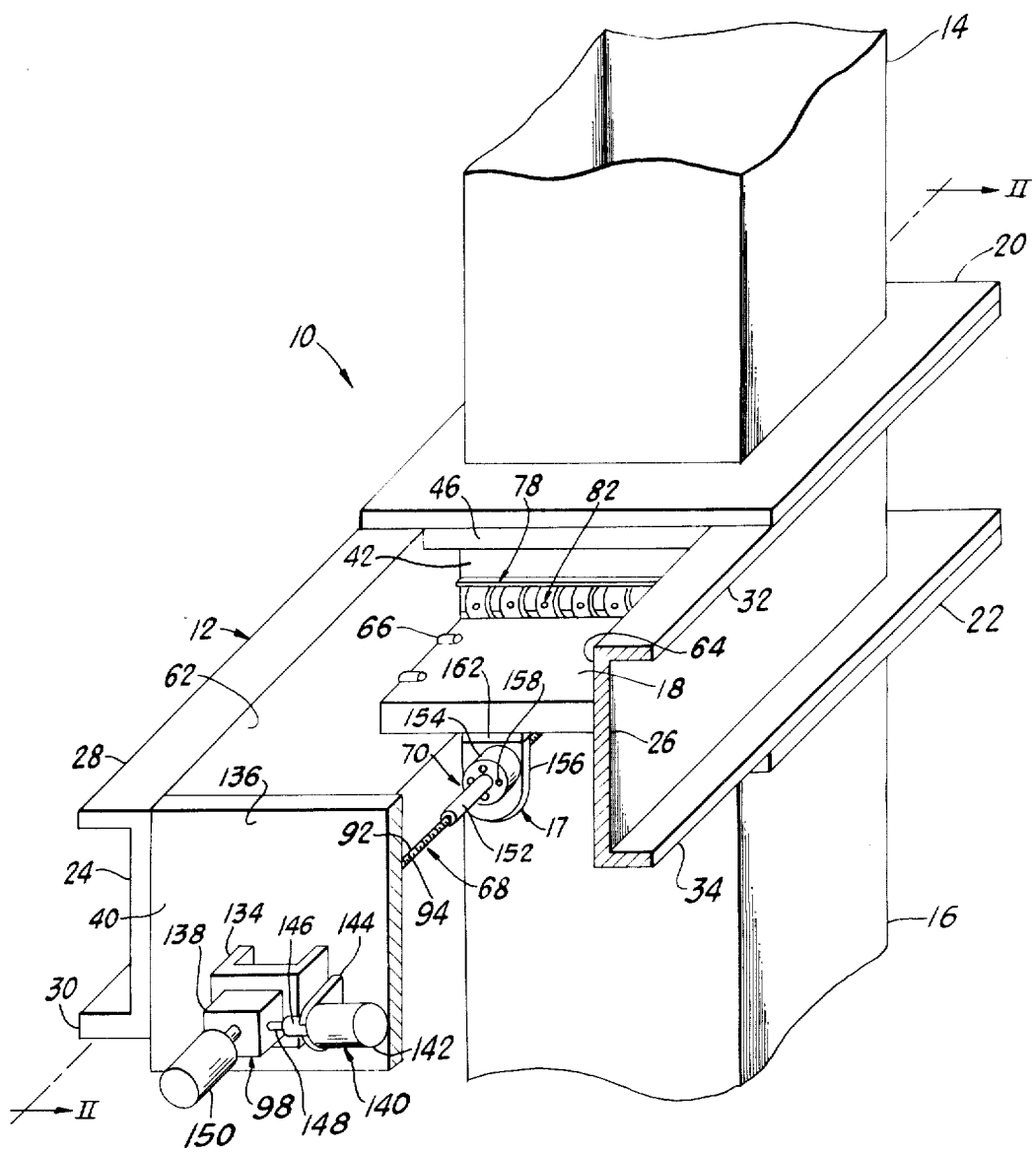
FIG. 1 is a perspective view of an enclosure positioned between a pair of spaced conduits with a closure movable by an actuator of the present invention through an opening in one wall of the enclosure looking downward and to the left.

The present invention is generally shown in FIG. 1 as it is applied to a gas flow regulating system noted generally by numeral 10 wherein a fluid cut-off apparatus noted generally by numeral 12 is positioned between a pair of gas conduits 14 and 16. The fluid cut-off apparatus 12 utilizes a movable closure 18 that is moved into or out of the space between conduits 14 and 16 by an actuator mechanism noted generally by numeral 17 thereby regulating the amount of fluid passing from one conduit to the other.

More specifically, the gas flow regulating system 10 comprises a gas conduit or duct 14 that has a flange 20 extending around its entire outer periphery and a second conduit or duct 16 with a flange 22 extending around its entire outer periphery. A fluid cut-off apparatus 12 includes a pair of side frames 24 and 26 each having a pair of flanges 28, 30, 32, and 34 respectively, a back frame 36 (FIG. 2) having a pair of flanges 38 and 39 secured such as by welding between side frames 24 and 26, a front frame 40 secured such as by welding between side frames 24 and 26, two center frames 42 and 44 (FIG. 2) having flanges 46 and 48 respectively secured such as by welding between side frames 24 and 26 so that center frames 42 and 44 are axially aligned but have a space 50 (FIG. 2) between their end points 52 and 54 and at a point where the inside frames 24 and 26, back frame 36, and center frames 42 and 44 are substantially the same dimension as the inside peripheries of ducts 14 an 16. A closure gate 18 whose width is substantially the same as the separation distance between side frames 24 and 26 and whose length is greater than the separation distance between back frame 36 and center frames 42 and 44 is movable between side frames 24 and 26 and is movable substantially perpendicularly through space 50 and into enclosure 56 so that end point 58 (FIG. 2) substantially abuts back frame 36 thereby separating one side of enclosure 56 from the other. Support rollers 60 (FIG. 2) are secured such as by bolting to the inboard surfaces 62 and 64 of side frames 24 and 26. A support rail 61 surrounds the entire inner periphery of enclosure 56 and is aligned with surface 54 of center frame 44 and is secured thereto such as by bolting with bolts 100 for supporting closure 18 as it moves into and out of enclosure 56 and to provide an effective seal against gas seepage between the inner periphery of enclosure 56 and the outer periphery of closure 18. A series of hold down rollers 66 are secured, such as by bolting along the inboard surfaces 62 and 64 both inside and outside enclosure 56, slightly above closure 18 for insuring that closure 18 maintains its position on support rollers 60 and support rail 61 as closure 18 moves into and out of enclosure 56.

The actuator mechanism 17 of the present invention (to be described in detail later) genrally comprises a rotatable screw shaft mechanism noted generally by numeral 68 and a linking mechanism noted generally by numeral 70 which connects closure 18 with screw shaft mechanism 68. When screw shaft mechanism 68 is rotated it moves linking mechanism 70 parallel to the axis of rotation of screw shaft mechanism 68 thus moving closure 18 into and out of enclosure 56.

A self-adjusting sealing apparatus noted generally as numeral 78 extends substantially the width of closure 18 and is secured to center frames 42 and 44 (FIG. 2) so that sealing elements 80 and 90 (FIG. 2) of sealing apparatus 78 are in engagement with both sides of closure 18 and center frames 42 and 44 (FIG. 2) and are urged into engagement by a resilient retaining means noted generally by numeral 82 thereby sealing the spaces between the surfaces of closure 18 and center frames 42 and 44. The self-adjusting sealing apparatus 78 has been described in detail in the above-mentioned co-pending application and therefore will not be further described herein.

Figure 2:
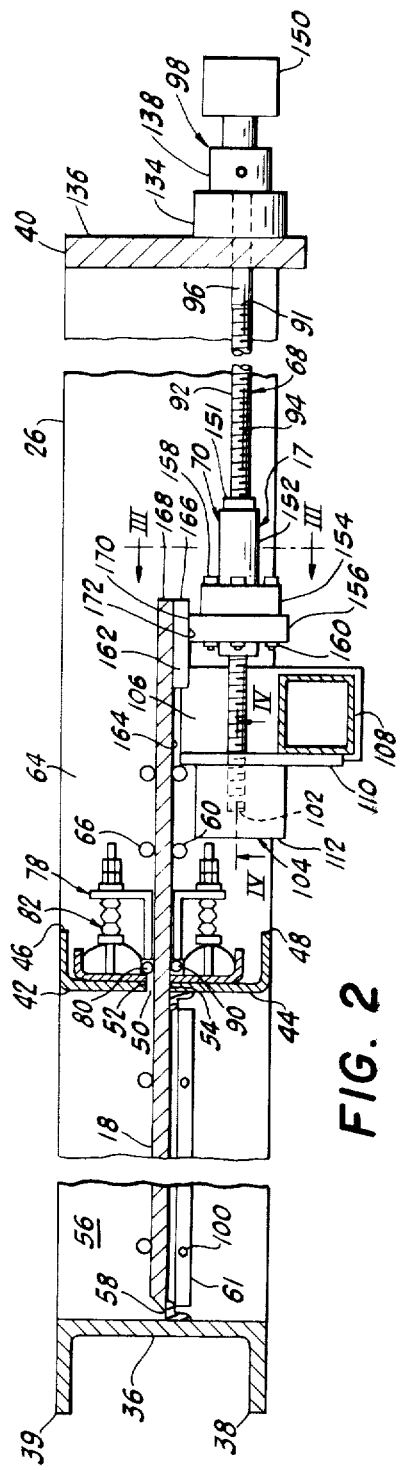
FIG. 2 is a side elevation in cross-section taken along line II—II of FIG. 1, showing the side frame, enclosure, closure, sealing apparatus, and actuator mechanism.

The fluid cut-off apparatus 12, with all its component parts, is placed between ducts 14 and 16 so that flange 20 of duct 14 is in contact with flanges 28 and 32 of side frames 24 and 26, flange 46 of center frame 42, and flange 39 of back frame 36 (FIG. 2) and flange 22 of duct 16 is in contact with flanges 30 and 34 of side frames 24 and 26, flange 48 of center frame 44 (FIG. 2), and flange 38 of back frame 36 (FIG. 2). All flanges are secured to each other by any suitable means, such as bolting thereby defining an enclosure 56 between ducts 14 and 16 of substantially the same inside peripheral dimension as the inside peripheral dimension of ducts 14 and 16. By providing enclosure 56 with substantially the same inside peripheral dimension as ducts 14 and 16 the gas flow through enclosure 56 will remain substantially at the same rate as the flow through ducts 14 and 16 when closure 18 is in its fully opened position.

It is to be understood that for illustration purposes ducts 14 and 16 have been depicted as being square, but other shapes such as rectangular, circular, and oval ducts may be used. Should other shapes be used, the fluid cut-off apparatus should also be shaped accordingly so that the enclosure defining the space between the ducts will be of substantially the same inside peripheral dimension as the ducts.

Figure 3:
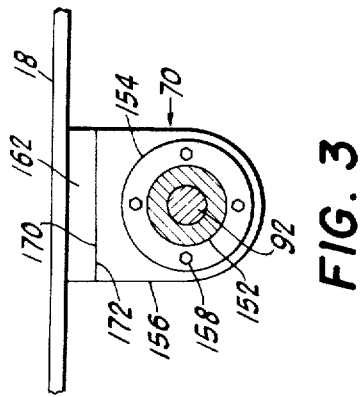
FIG. 3 is an enlarged front view taken along line III—III of FIG. 2, showing the linking mechanism between the closure and the rotatable screw shaft mechanism.

Referring now to FIGS. 1, 2, and 3, the fluid cut-off apparatus 12 utilizes a closure 18 to regulate the flow of fluid passing through enclosure 56. Closure 18 is moved into and out of enclosure 56 by actuator mechanism 17. The actuator mechanism 17 generally comprises a rotatable screw shaft mechanism 68 extending substantially parallel to the path of travel of closure 18 and a linking mechanism 70 which connects screw shaft mechanism 68 to closure 18 so that when screw shaft mechanism 68 is rotated linking mechanism 70 moves parallel to the axis of rotation of screw shaft mechanism 68 propelling closure 18 into and out of enclosure 56.

More specifically, and referring to FIGS. 1 and 2, screw shaft mechanism 68 of actuator mechanism 17 comprises a shaft 91 having external screw threads 94. Shaft 92 is of sufficient length so that linking mechanism 70 can move closure 18 to its fully closed position and to its fully opened position and, in addition, shaft 92 is preferably positioned substantially parallel to the path of travel of closure 18. Shaft 92 is illustrated parallel to and below closure 18, however, shaft 92 may be positioned above or beside closure 18 and may be slightly angled away from closure 18 without any detrimental effect on the overall performance of actuator 17. A non-threaded spacer shaft 96 is connected to end 91 of shaft 92 such as by welding, keying, or pinning (not shown). Spacer shaft 96 extends through frame 40 a sufficient amount so that it can be connected to a drive mechanism noted generally by numeral 98, to be described later. The other end 102 of shaft 92 includes a thrust bearing assembly noted generally by numeral 104 that allows shaft 92 to rotate within thrust bearing assembly 104. To support thrust bearing assembly 104 and thus maintain shaft 92 substantially parallel to closure 18, a pair of plates 106, only one shown in FIG. 2, is welded or bolted to surfaces 62 and 64 of side frames 24 and 26 respectively. A four sided hollow support 108 spans between plates 106 and is secured thereto such as by welding. A stiffening plate 110 (FIGS. 2 and 4) surrounds an end of a housing 112 of thrust bearing assembly 104 and is secured thereto such as by welding. Stiffening plate 110 abuts support 108 and is secured thereto such as by welding, thus providing a rigid support for thrust bearing assembly 104 and shaft 92.

Figure 4:
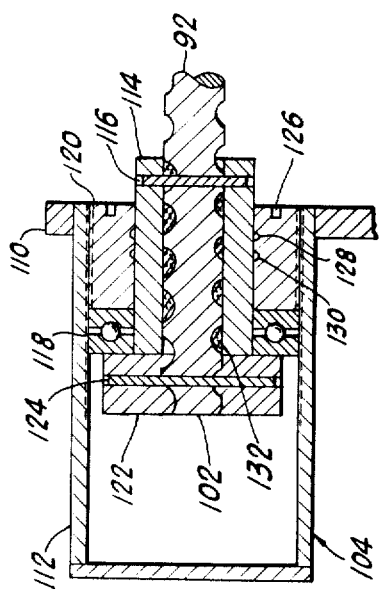
FIG. 4 is an enlarged elevation in cross-section taken along line IV—IV of FIG. 2, showing the construction of the thrust bearing assembly.

Referring now to FIG. 4, thrust bearing assembly 104 includes end portion 102 of shaft 92. Surrounding a portion of end 102 is a bearing member 114 is secured to end 102 by pin 116, thus when shaft 92 is rotated bearing member 114 will also rotate. A second bearing member 118, whose axial length is less than bearing member 114, surrounds a portion of bearing member 114. The inner diameter of bearing member 118 is substantially the same as the outer diameter of bearing member 114 and the outer diameter of bearing member 118 is substantially the same as the inner diameter of housing 112, thus eliminating any radial movement of shaft 92 when bearing member 114 rotates within bearing member 118. Housing 112 is provided with internal screw threads. An adjusting nut 120 surrounds a portion of bearing member 114 and is provided with external screw threads. Adjusting nut 120 is threaded into housing 112 until it substantially abuts bearing member 118. A stop collar 122, whose outer diameter is greater than the outer diameter of bearing member 114, and having internal screw threads matching the screw threads on shaft 92, is threaded onto end portion 102 of shaft 92 and is secured thereto by pin 124 so that collar 122 substantially abuts bearing member 114. When shaft 92 tries to move out of thrust bearing assembly 104, stop collar 122 abuts bearing member 118 which abuts adjusting nut 120 which is secured to housing 112, thus preventing any substantial axial movement of shaft 92 toward drive mechanism 98.

Adjusting nut 120 is provided with a plurality of holes 126 so that a spanner wrench or similar device can be used to thread it into housing 112. Adjusting nut 120 is also provided with a plurality of grooves 128 on its inner surface. Conventional "O" rings 130 are inserted in grooves 128 and contact bearing member 114 to provide an effective seal between adjusting nut 120 and bearing member 114 to maintain lubricants within thrust bearing assembly 104. The threaded portion of shaft 92 between bearing member 114 is provided with a fiberous packing material 132 or similar material in order to prevent dust and other foreign material from entering thrust bearing assembly 104.

The rotatable screw shaft mechanism 68, further includes a drive mechanism 98 which rotates shaft 92. Drive mechanism 98 comprises a mounting platform 134 which is secured to the outside surface 136 of frame 40 such as by welding so that the centermost portion of platform 134 is in line with shaft 92 and spacer 96. Mounted on platform 134 is a conventional gear reducer 138 and secured thereto such as by welding or bolting. Spacer 96 extends through platform 134 and into gear reducer 138 where it mates with a thrust bearing assembly (not shown) similar to that used on end 102 of shaft 92 and it also mates with a splined or keyed gear in reducer 138 for subsequent rotation of shaft 92 by a driving apparatus noted generally by numeral 140 (FIG. 1). The thrust bearing in reducer 138 supplies the bearing surface for rotation of shaft 92 and also prevents any substantial axial movement of shaft 92 toward thrust bearing assembly 104 during pulling of the closure 18 out of enclosure 56. The driving apparatus as shown in FIG. 1 is preferably a conventional electric motor 142. Motor 142 is mounted on surface 136 of frame 40 by a plate 144 which surrounds a collar 146 of motor 142. Plate 144 is secured to surface 136 such as by welding. A shaft 148 extends from motor 142 through collar 146 and into gear reducer 138 where it mates with the various reduction gears, so that when shaft 148 rotates, it will also rotate spacer 96 and shaft 92. Although the preferred driving apparatus 140 is an electric motor 142, other types of driving apparatuses may be used, such as, for example, a hand crank (not shown) or a chain and sprocket arrangement (not shown). A conventional electrical limit switch 150 is connected to gear reducer 138 and, when activated by, for example, the number of revolutions of shaft 92, automatically shuts down motor 142 when closure 18 is in the fully closed or open position, thus preventing any damage to the fluid cut-off apparatus.

Gear reducer 138, motor 142, limit switch 150, and traveling nut 152 are available commercially and may be purchased as an entire package, for example, from Limitorque Corporation, 181 South Gulph Road, King of Prussia, Pennsylvania 19046 under Part No. MX-2020-LS. Screw shaft 92 is also available from the same manufacturer under Part No. 60-323-0484-2.

Referring now to FIGS. 1, 2, and 3, the preferred linking mechanism 70 of actuator mechanism 17 comprises a traveling nut 152 which surrounds shaft 92. Traveling nut 152 has an internal screw threaded portion (not shown) which meshes with external screw threads 94 of shaft 92. One end of traveling nut 152 has an external screw threaded portion (not shown) on which a collar 154, having internal screw threads, is threaded. Collar 154 is secured to traveling nut 152 by pinning or keying. The other end of traveling nut 152 contains a scraper 151 so that when traveling nut 152 moves along shaft 92, scraper 151 removes any foreign matter from screw threads 94 of shaft 92. Surrounding traveling nut 152 is a rigid tongue 156 which abuts collar 154 and is secured to collar 154 by bolts 158 and nuts 160. Tongue 156 extends perpendicular to the axis of rotation of shaft 92 and extends above collar 154 toward closure 18. A rigid support plate 162 is secured to surface 164 on closure 18 such as by welding or bolting so that end 166 of plate 162 is flush with end 168 of closure 18. Surface 170 of tongue 156 mates with surface 172 of plate 162 and tongue 156 is secured to plate 162 such as by welding, thus rigidly connecting traveling nut 152 to closure 18.

Figure 5:
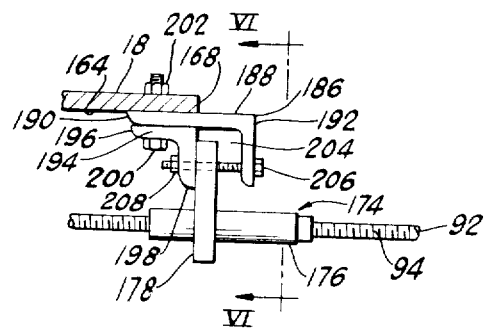
FIG. 5 is a partial side elevation of an alternate embodiment of the linking mechanism of FIG. 2.
Figure 6:
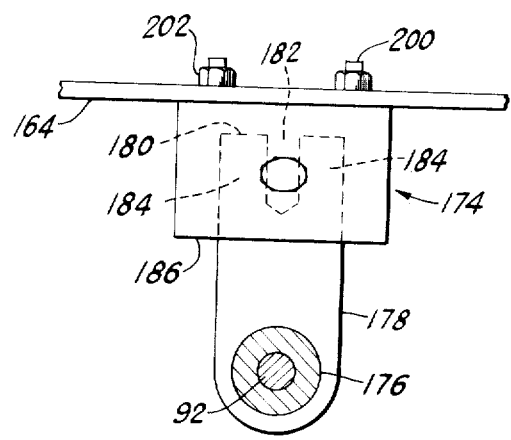
FIG. 6 is an enlarged front view taken along line VI—VI of FIG. 5, showing the alternate embodiment of the linking mechanism between the closure and the rotatable screw shaft mechanism.

FIGS. 5 and 6 illustrate an alternate embodiment for a linking mechanism noted generally as numeral 174. Linking mechanism 174 comprises a traveling nut 176 which surrounds shaft 92. Traveling nut 176 has an internal screw threaded portion (not shown) which meshes with the external screw threads 94 of shaft 92. Surrounding traveling nut 176 is a rigid tongue 178 which extends substantially perpendicular to the axis of rotation of traveling nut 176. That portion of tongue 178 that suroounds traveling nut 176 is secured to traveling nut 176 such as by welding. Referring now to FIG. 6, the other end 180 of tongue 178 has a slot 182 extending from end 180 toward the center of tongue 178, thus providing end 180 with a pair of spaced extensions 184.

Linking mechanism 174 further includes a rigid "L" shaped plate 186 whose top surface 188 of its leg 190 abuts the bottom surface 164 of closure 18. Leg 190 also extends beyond the end portion 168 of closure 18 and leg 192 of plate 186 extends toward traveling nut 176. A second L-shaped plate 194 with legs 196 and 198 is positioned so that leg 196 abuts the other side of leg 190 of plate 186. Leg 196 of plate 194 is shorter than leg 190 of plate 186 so that leg 196 does not extend beyond end 168 of closure 18. Legs 196 of plate 194 and 190 of plate 186 are secured to closure 18 by bolts 200 and nuts 202. Leg 198 of plate 194 extends toward traveling nut 176 thus defining a space 204 between legs 192 and 198. A bolt 206 extends through leg 192 and into space 204 and through leg 198. A nut 208 secures bolt 206 to legs 192 and 198. End 180 of tongue 178 is positioned within space 206 between legs 192 and 198 and bolt 206 fits within slot 182 of tongue 178, thus connecting traveling nut 176 to closure 18.

In operation, when closure 18 is to be moved into enclosure 56, electric motor 142 is energized in the proper direction to move closure 18 into enclosure 56. Shaft 148 is rotated by motor 142 and through gear reducer 138 imparts a lesser revolution per minute rotation to spacer 96 than that being turned by motor 142. Spacer 96 rotates shaft 92 and screw threads 94 on shaft 92 engage the internal screw threads on traveling nut 152. Since traveling nut 152 is rigidly connected to closure 18 by collar 154, tongue 156, and plate 162, traveling nut 152 will not rotate when shaft 92 is rotated. As screw threads 94 of shaft 92 initially contact the internal screw threads of traveling nut 152, the weight and frictional sliding of closure 18 tends to retard the movement of traveling nut 152 toward enclosure 56. When this occurs shaft 92 tries to move through traveling nut 152 toward gear reducer 138. Stop collar 122 in thrust bearing assembly 104 rides up against bearing member 118 which rides up against adjusting nut 120, thus preventing any axial movement of shaft 92 toward gear reducer 138. Since shaft 92 cannot move through traveling nut 152, traveling nut 152 is propelled toward enclosure 56, and since closure 18 is connected to traveling nut 152, it is moved into enclosure 56. Since shaft 92 tries to move toward reducer 138 but is prevented from doing so by stop collar 122 in thrust bearing assembly 104, that portion of shaft 92 between traveling nut 152 and thrust bearing assembly 104 will be in tension while that portion of shaft 92 between traveling nut 152 and reducer 138 will be in an unloaded condition, that is, neither in tension nor compression.

Once closure 18 is in the closed position, that is, when end 58 of closure 18 substantially abuts end frame 36, limit control 150 is activated and shuts down motor 142 which stops the rotation of shaft 92.

To pull closure 18 out of enclosure 56, motor 142 is activated and is turned in the opposite direction from which it was rotated for closing closure 18 and through gear reducer 138 shaft 92 is rotated in the opposite direction from which it was rotated for closing closure 18. As screw threads 94 of shaft 92 initially contact the internal screw threads of traveling nut 152, the weight and frictional sliding of closure 18 tends to retard the movement of traveling nut 152 toward reducer 138. When this occurs shaft 92 tries to move through traveling nut 152 toward thrust bearing assembly 104. A stop collar (not shown) in reducer 138 which is similar to stop collar 122 on end 102 of shaft 92 prevents any axial movement of shaft 92 toward thrust bearing assembly 104. Since shaft 92 cannot move through traveling nut 152, traveling nut 152 is propelled toward reducer 138, and since closure 18 is connected to traveling nut 152, it is moved out of enclosure 56. Since shaft 92 tries to move toward thrust bearing assembly 104 but is prevented from doing so by the stop collar in reducer 138, that portion of shaft 92 between traveling nut 152 and reducer 138 will be in tension, while that portion of shaft 92 between traveling nut 152 and thrust bearing assembly 104 will be in the unloaded condition.

Once closure 18 is in the open position, that is, just before end 58 of closure 18 passes through space 50, limit control 150 is activated and shuts down motor 142 which stops the rotation of shaft 92.

The operation of alternate linking mechanism 174 in FIGS. 5 and 6 is similar to that as described for the preferred linking mechanism 70, however, linking mechanism 174 may be desirable where, due to extreme temperatures of the fluid passing through enclosure 56, closure 18 tends to warp. When this occurs, bolt 206 slides up or down in slot 182 of tongue 178, thus preventing any strain from being imparted to tongue 178 and traveling nut 176 which could cause traveling nut 176 to bind on shaft 92. Also, when closure 18 moves into and out of enclosure 56, closure 18 may tend to move from side to side a slight amount. when this occurs bolt 206 presses against one of the extensions 184 causing tongue 178 and traveling nut 176 to rotate a slight amount around shaft 92, thus preventing any binding between traveling nut 176 and shaft 92.

Although the invention has been illustrated as using a single closure and single actuator mechanism, it should be understood, however, that the actuator mechanism can also be adapted for use on a dual closure system as described in co-pending application ser. no. 245,880 filed Apr. 20, 1972. Also, a dual actuator system can be utilized on a single closure by connecting the two reducers with a shaft so that the two screw shafts will turn at the same revolutions per minute. A dual actuator system would be used where the single closure is exceptionally large and heavy.

The foregoing has presented a novel actuator drive system for moving a closure into and out of an enclosure for regulating the flow of fluid through the enclosure.

Accordingly, the invention having been described in its best embodiment and mode of operation, that which is desired to be claimed by Letters Patent is:

1. Fluid cut-off apparatus for a gas conduit, comprising:
 a pair of axially aligned conduits defining a space therebetween;
 an enclosure connecting said conduits and closing said space to surrounding atmosphere, said enclosure including an opening substantially perpendicular to said conduits;

a closure in said opening movable into said space for preventing passage of fluid from one of said conduits to the other;

a first sealing element extending the width of said closure and acting against a wall of said enclosure and against an adjacent first surface on said closure;

a second sealing element being distinct and separate from said first sealing element and extending the width of said closure and acting against said wall and against an adjacent second surface on said closure opposite to said first surface, for preventing the escape of fluid between said first and second surfaces on said closure and said wall;

a plurality of resilient retaining means mounted on said wall and equally spaced along the width of said first and second surfaces for continuously urging said first and second sealing elements agains said wall and against said first and second surfaces to reduce the escape of said fluid between said first and second sealing elements and said first and second surfaces; and an actuator means for moving said closure into and out of said enclosure, said actuator means including:

a rotatable screw shaft means extending substantially parallel to the path of travel of said closure; and a linking means connecting said screw shaft means to said closure, for moving said closure into and out of said space upon rotation of said screw shaft means.

2. The apparatus of claim 1 wherein said rotatable screw shaft means includes:

a shaft having an external threaded portion for engaging said linking means;

a support means supporting one end of said shaft for rotation therein; and a drive means connected to and supporting the other end of said shaft for rotating said shaft.

3. The apparatus of claim 2 wherein said drive means includes an electric motor.

4. The apparatus of claim 1 wherein said linking means includes:

a traveling nut surrounding an externally threaded portion of said screw shaft means, said traveling nut having an internally threaded portion engaging said externally threaded portion of said screw shaft means, and a connector means for connecting said traveling nut to said closure, for moving said closure into and out of said enclosure upon rotation of said threaded portion of said screw shaft means.

* * * * *